United States Patent [19]

Hargrave, III et al.

[11] Patent Number: 5,724,593
[45] Date of Patent: Mar. 3, 1998

[54] MACHINE ASSISTED TRANSLATION TOOLS

[75] Inventors: James E. Hargrave, III, Longmont; Yves I. Savourel, Boulder, both of Colo.

[73] Assignee: International Language Engineering Corp., Boulder, Colo.

[21] Appl. No.: 789,594

[22] Filed: Jan. 24, 1997

Related U.S. Application Data

[63] Continuation of Ser. No. 484,981, Jun. 7, 1995, abandoned.

[51] Int. Cl.$^6$ .................................................. G06F 17/28
[52] U.S. Cl. ............................................ 395/757; 395/605
[58] Field of Search .................................... 395/757, 759, 395/760, 793, 794, 605, 2.49, 2.52, 2.64; 382/228, 229, 230

[56] References Cited

U.S. PATENT DOCUMENTS

| | | | |
|---|---|---|---|
| 4,685,060 | 8/1987 | Yamano et al. | 364/419 |
| 4,829,580 | 5/1989 | Church | 395/2.69 |
| 5,051,947 | 9/1991 | Messenger et al. | 364/900 |
| 5,062,143 | 10/1991 | Schmitt | 382/228 |
| 5,140,522 | 8/1992 | Ito et al. | 364/419 |
| 5,146,405 | 9/1992 | Church | 364/419 |
| 5,276,741 | 1/1994 | Aragon | 382/40 |
| 5,303,151 | 4/1994 | Neumann | 364/419.02 |
| 5,325,298 | 6/1994 | Gallant | 364/419.19 |
| 5,357,431 | 10/1994 | Nakada et al. | 364/419.13 |
| 5,404,514 | 4/1995 | Kageneck et al. | 395/600 |
| 5,418,951 | 5/1995 | Damashek | 395/605 |
| 5,467,425 | 11/1995 | Lau et al. | 395/2.64 |
| 5,510,819 | 4/1996 | Berger et al. | 395/759 |

OTHER PUBLICATIONS

W.B. Frakes, "Introduction to Information Storage and Retrieval Systems," Ch. 1, pp. 1–12.

Ricardo A. Baeza-Yates, "Introduction to Data Structures and Algorithms Related to Information Retrieval," Ch. 2, pp. 13–27.

Donna Harman et al., "Inverted Files," Ch. 3, pp. 28–43.

Marc Damashek, "Gauging Similarity with n–Grams: Language–Independent Categorization of Text," Feb. 10, 1995, Science, vol. 267, pp. 843–848.

Anonymous, "Language Translation," pp. 733–737.

Anonymous, "Trados Translator's Workbench for Wnidows," two page article, 1994.

*Primary Examiner*—Jeffery Hofsass
*Assistant Examiner*—Andrew Hill
*Attorney, Agent, or Firm*—Dorr, Carson, Sloan &Birney, P.C.

[57] ABSTRACT

A translation memory for computer assisted translation based upon an aligned file having a number of source language text strings paired with target language text strings. A posting vector file includes a posting vector associated with each source language text string in the aligned file. Each posting vector includes a document identification number corresponding to a selected one of the source language text strings in the aligned file and a number of entropy weight values, each of the number of weight values corresponding to a unique letter n-gram that appears in the selected source language text string. Preferably, the translation memory further includes an inverted index comprising a listing of source language letter n-grams and a pointer to each of the posting vectors including an entry for the listed letter n-gram.

18 Claims, 7 Drawing Sheets

| Segment length | Source Text Segment | Segment length | Target Text Segment | Segmentt length | Source Text Segment |

← 403

← 405

← 407

| Text Segment 1 Address | Text Segment 2 Address | Text Segment 3 Address | ... | Text Segment N Address |
|---|---|---|---|---|

| N-gram 1 | Entropy Weight | Count of posting Vectors | Pointers to Posting Vectors |
|---|---|---|---|
| N-gram 2 | Entropy Weight | Count of posting Vectors | Pointers to Posting Vectors |
| N-gram 3 | Entropy Weight | Count of posting Vectors | Pointers to Posting Vectors |
| . | . | . | . |
| . | . | . | . |
| . | . | . | . |
| N-gram n | Entropy Weight | Count of posting Vectors | Pointers to Posting Vectors |

FIG.8

MACHINE ASSISTED TRANSLATION TOOLS

This application is a continuation of application Ser. No. 08/484,981 filed on Jun. 7, 1995, now abandoned.

BACKGROUND OF THE INVENTION

1. Field of the Invention

The present invention relates, in general, to machine processing of text and language, and, more particularly, to a method and apparatus including a software implementation for machine assisted translation.

2. Statement of the Problem

Translation of text from one language to another is often a tedious task requiring the efforts of a skilled translator. Soon after the advent of computers, researchers began to use computers as an aid for natural language translation. The earliest machine translation (MT) systems relied on large bilingual dictionaries where entries for words of the source language (SL) gave one or more equivalents in the target language (TL). It quickly became apparent that dictionary rules for syntax and grammar were so complex that experts could not develop a comprehensive set of rules to describe the language. These problems have proven so intractable that most efforts at machine translation have been abandoned.

Throughout the world, multilingual cultures and multinational trade create an increasing demand for translation services. The demand for translation of commercial and technical document translation represents a large and growing segment of the translation market. Examples of such documents are contracts, instruction manuals, forms, and computer software. Often when a product or service is "localized" to a new foreign market, a great deal of documentation must be translated, creating a need for cost-effective translation. Because commercial and technical information is often detailed and precise, accurate translations continue to be demanded.

Machine translation (MT) systems are usually classified as either direct, transfer-based, or interlingua-based. In the direct approach, there are no intermediate representations between the source language and the target language. The source language text is processed "directly" in order to transform it into the target text, essentially a word-to-word translation with some adjustments. This approach is not followed by any MT system at present on account of a perceived weakness attributable to ignoring all aspects of the internal structure of sentences.

In the transfer-based approach, information from the various stages of analysis from the source text is transferred to the corresponding stages of the generation of the target text, for example, transfer is achieved by setting up correspondences at the lexical level, at the grammar level, or at the level of the structure built by the grammar, and so forth. The transfer method operates only on a particular pair of languages, and so must be specifically and painstakingly created for each pair of languages.

The interlingua-based approach depends on an assumption that a suitable intermediate representation can be defined such that the source text can be mapped into the intermediate representation that can then be mapped into the target text. In principle, this approach is clearly attractive because, unlike the transfer-based approach, it is not necessary to build a separate transfer program for each pair of languages. However, it is not clear whether a truly language-independent intermediate representation can be devised. Current interlingua-based systems are much less ambitious about their claims to the universality of the intermediate representation. For a high-quality translation, it is often necessary to have access to some particular aspects of the source and target languages.

In the transfer-based approach, there have been some recent advances. In the development of mathematical and computational models of grammars there is increasing emphasis on locating syntactic as well as semantic information directly with the lexical items by associating structures with the lexical items and defining operations for composing these objects. From this perspective, all the information particular to a language is encapsulated in the lexical items and the structures associated with them. Different languages will be distinguished at this level, but not with respect to the operations for composing these structures, which are the same for all languages, on this approach. The idea then, it to define all bilingual correspondences at this level. It remains to be seen if this approach can be carried out across a variety of languages.

Some existing MT systems require documents to be written in highly constrained texts. Such a system is useful for preparing manuals in different languages. Here the system is really not translating a manual written in one natural language into a set of other natural languages, but rather is generating multilingual texts from a highly constrained text, thus avoiding many problems in conventional MT.

Recently, research has focused on ways of using machines to assist human translators rather than to autonomously perform translations. This approach is referred to as machine assisted translation or interactive translation. Systems are available that produce high-quality translation of business correspondence using pre-translated fragments with some translations filled in by human translators. An example of a machine assisted translation tool is a translation memory (TM). A translation memory is a database that collects translations as they are performed along with the source language equivalents. After a number of translations have been performed and stored in the translation memory, it can be accessed to assist new translations where the new translation includes identical or similar source language text as has been included in the translation memory.

The advantage of such a system is that it can in theory leverage existing MT technology to make the translator more efficient, without sacrificing the traditional accuracy provided by a human translator. It makes translations more efficient by ensuring that the translator never has to translate the same source text twice. However, because translation memories require large data files that must be searched to retrieve matching text, they have been slow. Often a skilled human translator can perform the translation more quickly than the machine can locate the pre-translated material. A continuing need exists for translation memory tools with rapid search and retrieval capability.

Translation memories are most useful when they are able to locate not only identical matches, but also approximate or "fuzzy matches." Fuzzy matching facilitates retrieval of text that differs slightly in word order, morphology, case, or spelling. The approximate matching in necessary because of the large variety possible in natural language texts. Examples of systems using fuzzy matching include Translator's Workbench for Windows by Trados and Deja Vu published by Atril. The particular implementation of a fuzzy matching system is critical to performance, however.

Because TMs do not analyze syntax or grammar they are more language independent than other translation techniques. In practice, however, it has been difficult to implement search software that is truly language independent. In particular, existing search engines are word based, which is to say that they rely on the word as a basic element in accomplishing the search. This is particularly true of fuzzy search methods. In each language, words change in unique ways to account for changes in gender, plurality, tense, and the like. Hence, word-based systems cannot be truly language independent because the words themselves are inherently language oriented. It has been a continuing difficulty to develop fast, accurate fuzzy text search methods.

Concordances are another tool commonly used by translators. Electronic concordances are files having text strings (i.e., words, phrases or sentences) matched with the context in which the word appeared in a document. When a translator is unsure of the meaning to be given a particular word, the concordance can demonstrate how the word is used in several different contexts. This information allows more accurate selection of translations to accurately reflect the meaning of a source language document. Electronic concordances include text searching software that allows the translator to extract all text strings in a library that include a desired word or phrase. The extracted texts strings can be examined quickly to gain a greater understanding of how a particular word or phase is used in context.

Multilingual natural language processing represents a growing need and opportunity in the field of international commerce and communication. Machine assisted translation tools are needed to make document translation more efficient and less costly. Further, machine assisted translation tools are needed that efficiently leverage the large amount of stored knowledge available as pretranslated commercial and technical documents. Specifically, a need exists for a translation memory tool that is language independent and provides accurate, rapid fuzzy retrieval of pre-translated material.

3. Solution to the Problem

The above problems are solved by the present invention by translation tools that are inherently language independent. Differential weighting of novel text segments provides an ability to fuzzy match words, phases, as well as full sentences and multiple sentence documents. Fuzzy matching permits effective fuzzy concordance searching on substrings within sentences.

SUMMARY OF THE INVENTION

The present invention involves a translation memory for computer assisted translation. An aligned file having a number of source language text strings paired with target language text strings is encoded in a computer readable format and stored in a computer usable memory. A posting vector file having a posting vector associated with each source language text string in the aligned file is also stored in the computer usable memory. Each posting vector includes a document identification number corresponding to a selected one of the source language text strings in the aligned file and a number of entropy weight values, each of the number of weight values corresponding to a unique letter n-gram that appears in the selected source language text string. Preferably, the translation memory further includes an inverted index comprising a listing of source language letter n-grams, an entropy weight for each listed letter n-gram, a count of the number of posting vectors including an entry for the listed letter n-gram, and a pointer to each of the posting vectors including an entry for the listed letter n-gram.

Another aspect of the present invention involves a method for creating a translation memory. A weighted letter n-gram file for the source language is provided. An aligned file comprising a plurality of source language text strings, each source language text string paired with a target language text string. A text segment vector is determined for each source language document, the text segment vector including a listing of letter n-grams appearing in both the source language document and in the weighted letter n-gram file. Each letter n-gram in the text segment vector is associated with the entropy weight of that n-gram from the weighted letter n-gram file for the source language. Desirably the entropy weights in each text segment vector are normalized to reflect the length of each source language document. Preferably, an inverted index is created from the text segment vectors. The inverted index comprises a listing of the unique letter n-grams appearing in the text segment vectors wherein each listing of a unique letter n-gram in the inverted index is associated with a set of identifications that point to source language text strings in the aligned file that contain the associated letter n-gram.

In still another aspect of the present invention, specific methods and computer software tools are provided for accomplishing language analysis using letter n-grams, indexing pretranslated text using letter n-grams, and retrieving text from a translation memory using letter n-grams.

BRIEF DESCRIPTION OF THE DRAWING

FIG. 7 shows a file format for a posting vector file in accordance with a preferred embodiment;

FIG. 8 shows a file format for a correlation file in accordance with a preferred embodiment.

DETAILED DESCRIPTION OF THE DRAWING

1. Overview

Figure 1:
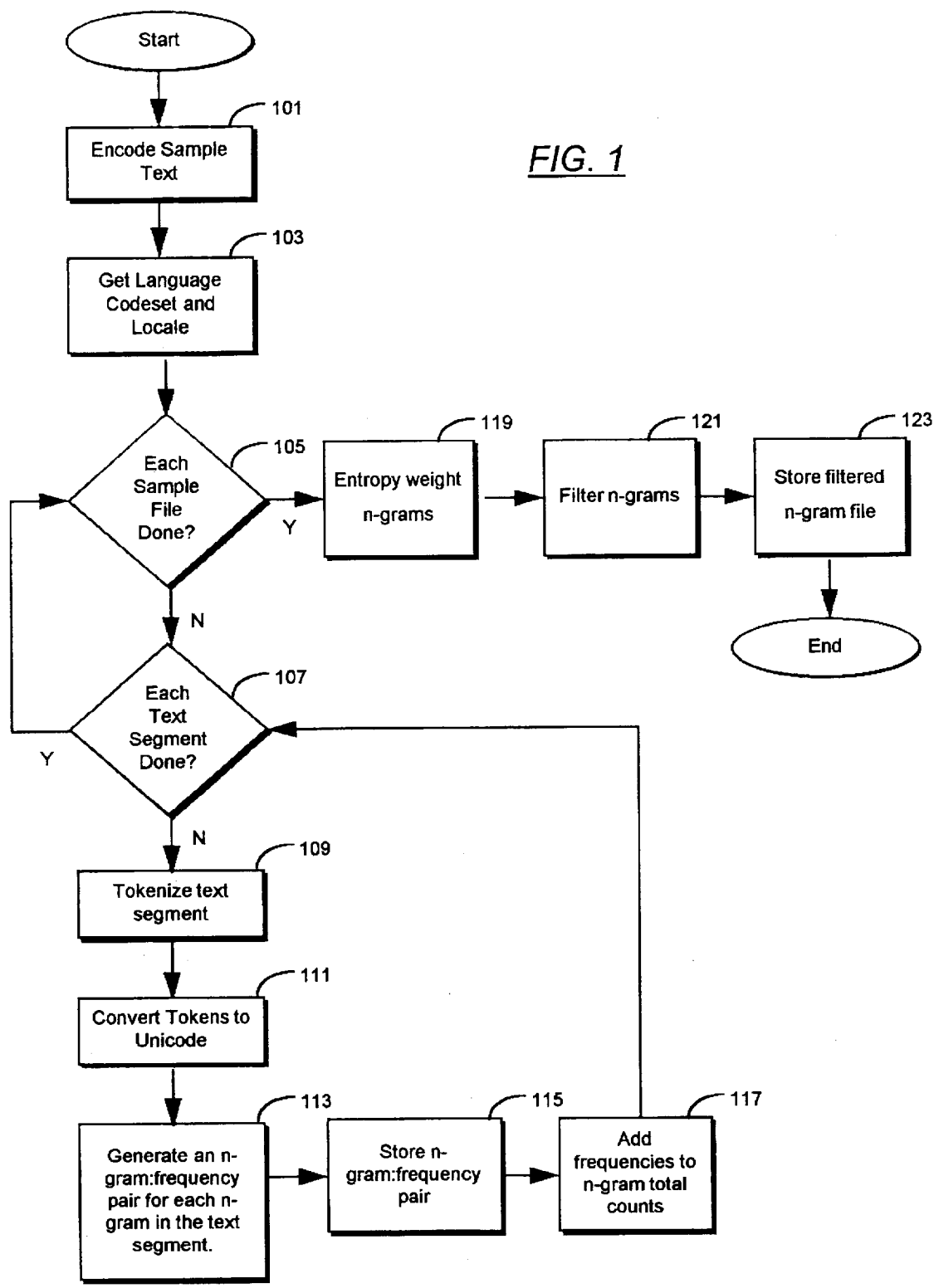
FIG. 1 shows a flowchart illustrating steps involved in a language analysis method in accordance with the present invention.

A translation memory (TM) provides a means to rapidly retrieve previously translated material. Fuzzy or approximate matching is one primary goal of a TM. Fuzzy matching facilitates retrieval of sentences that may differ slightly in word order, morphology, case or spelling. This approximate matching is necessary because of the myriad variations possible in natural language texts.

The TM in accordance with the present invention uses an architecture based on weighted letter n-grams. The term "letter n-grams" or n-grams is used herein to mean text strings comprising a sequences of n-consecutive characters. Retrieval is accomplished by representing text segments in a translation memory (e.g., words, phrases or sentences) as vectors of weighted n-grams. The vectors are compared using a suitable similarity function such as the cosine function for vectors. The similarity function generates a score that is used to rank possible matches so that the most similar text segments are found near the top of the list. A technique called vector-based retrieval is used to make the matching procedure fast. The vector-based retrieval model is one technique for performing fast sparse vector calculations.

In accordance with the present invention, the heart of the TM is an "aligned file" comprising a source language file that is broken into a plurality of text segments. Each text segment may be a word, group of words, phrase, sentence,. or the like. Each source language text segment is associated or aligned with a translated text segment in a target language. Many of the operations described below are performed only on the text strings in the source language file. However, it should be remembered throughout the discussion that each source language text segment is associated with a translated text segment in the aligned file thereby allowing searches of the source language text segments to produce translated text segments also.

The TM in accordance with the present invention is preferably implemented in software adapted to be executed on a general purpose programmable computer. Software incorporating the method and translation memory of the present invention has been implemented on IBM-PC compatible personal computers. It is contemplated that the translation memory and method of the present invention could be implemented in dedicated hardware.

The translation memory in accordance with present invention is most easily understood in terms of four main modules:

1. Language analyzer module;
2. Entropy Weight Normalization;
3. Indexing; and
4. Retriever.

Each module is discussed separately hereinbelow. Methods for making and using the translation memory in accordance with the present invention are separately discussed in greater detail.

2. Language Analyzer Module

The purpose of a language analyzer module is to determine the unique letter n-grams for a given text and provide a weight for each n-gram denoting its relative importance. In the preferred embodiment, the language analyzer module initially determines all unique letter n-grams without regard to content or frequency of occurrence.

The purpose of weighting is to be able to automatically eliminate "noisy" n-grams. Noisy n-grams include suffixes, affixes, and short, high frequency words (e.g., the, to, of, and the like). These are n-grams that do not distinguish text strings because of their common occurrence. In contrast, word roots usually are formed from n-grams that are less common. Hence, weighting allows less meaningful n-grams to be distinguished from more meaningful n-grams.

The language analyzer module can be used to analyze any number of text samples to obtain a library or history file of relevant n-grams for a particular language. It is believed that analysis of a large volume of source text can provide an informative glossary of significant n-grams for a language. Like a conventional dictionary, n-grams provide a signature for the language. Unlike conventional dictionaries, the significant n-grams identified by the language analyzer module represent a more fundamental characterization of the language because they are independent of the idiosyncrasies of a particular language.

A text sample to be analyzed is coded in a computer readable format in step 101 shown in FIG. 1. In view of the large quantity of text that is available in computer readable format, step 101 may already be performed without the need for additional coding. Each language is coded into a computer readable format using a particular, usually standardized codeset. For example, the United States commonly uses ASCII or one of its extensions for coding text. European computer users often use a codeset Latin-1. Japanese texts are often coded in JIS. These codes are largely incompatible, but the present invention compensates for that incompatibility as set out hereinbelow.

The text sample may be a source language file that is to be translated, a source language file that is already translated, or a source language file that is merely a reference sample of the source language. Each source language file comprises a number of text segments such as words, phrases, sentences, paragraphs or the like. The choice of how the source language file is divided is largely a design choice, although it is believed that breaking the source language file into text segments that represent sentences is the most useful for most translation purposes.

In step 103, the text codeset and locale information for the source language file are loaded. The codeset and locale information may be associated with the text sample or may be determined manually or automatically from the text sample. This information is necessary to allow the sample text file to be decoded properly.

Moving now to step 109, each text segment in the text sample is selected and processed through steps 109–117 in turn. The selected text segment is first tokenized in step 109. Tokenizing step 109 generates a set of letter n-grams included in the selected text segment. In a preferred embodiment, trigrams (i.e., three sequential characters) are used for English and Indo-European languages while bigrams (i.e., two sequential characters) are used for Asian languages such as Korean, Japanese and Chinese. It is expressly understood that the size of the n-gram is not a limitation of the present invention. Any n-gram size can be chosen including 1-grams, 2-grams, 3-grams, 4-grams, 5-grams, 6-grams, or higher. Various n-gram sizes will prove useful in some applications. It is also contemplated that a single translation memory will use more than one n-gram size. N-grams can also be chosen to approximate syllables in the source language.

The tokenizing step uses overlapping n-grams. For example, the sentence:

The boy ran.

is tokenized using trigrams as:

_Th; The; he_; e_b; _bo; boy; oy-; y-r; _ra; ran; an- where the character "_" indicates a space between characters. In practice the space character would be used, but the "_" is used here to ease illustration and understanding. Each trigram is referred to as a token or letter n-gram hereinafter.

In step 111, the tokens are converted to Unicode in a preferred embodiment. Although conversion to Unicode is not mandatory to the practice of the present invention, such conversion does improve language independence of the system in accordance with the present invention. Unicode is a 16-bit codeset developed to encode text from all major living languages as well as some dead languages. Each Unicode character requires 16 bits allowing for a total set of more than 65,000 unique characters. ASCII, for example, requires only seven bits per character. Unicode conversion step 111 increases memory requirements but allows the subsequent processing modules to act independently from the language being processed, and so offers an important advantage to the practice of the present invention. The result of Unicode conversion step 111 is that each n-gram is represented by a unique Unicode sequence. Hence, the selected text sequence is represented by a unique Unicode sequence for each n-gram included in the selected text sequence.

The frequency of each n-gram in the selected text sequence is next tabulated in step 113. In the example above, each n-gram that occurred in the simple sentence occurred only once. More complex sentences may have n-grams that appear more than once. The result of the tabulation step 113 is a set of frequency:n-gram pair for each selected text segment resembling:

TABLE 1

| _Th | The | he_ | e_b | _bo | boy | oy_ | y_r | _ra | ran | an_ |
|-----|-----|-----|-----|-----|-----|-----|-----|-----|-----|-----|
| 1   | 1   | 1   | 1   | 1   | 1   | 1   | 1   | 1   | 1   | 1   |

This set of frequency:n-gram pairs is saved in step 115 to some storage media, for example a magnetic disk, for later use.

It is also necessary to maintain a running count of the frequency with which each unique n-gram appears in the entire sample text file. This is easily accomplished by adding the frequency tabulation from step 113 to a global n-gram frequency file during step 117. This file resembles the frequency:n-gram pairs discussed in step 113, but would include all n-grams appearing in the sample text file, which may number in the thousands. Also, many n-grams in the global n-gram:freqency file will appear multiple times. Common n-grams in the English language such as "_i_" may appear hundreds of times in a given source text file.

Once the global n-gram:freqency file is updated for a selected text segment, flow returns to step 107 which causes all of step 109–117 to be repeated for each selected text segment in turn. Once all text segments of the current sample file are processed, flow transfers to step 105. Like step 107, step 105 causes steps 107–117 to be repeated for each sample text file that is to be processed.

After all of the source files have been processed, two important files have been created. First, a file organized by individual text segments comprising the n-gram:frequency information for that text segment. Second, the global n-gram:frequency file that contains a list of thousands of n-grams and the frequency with which they occurred in the sample text files.

In step 119, an entropy weight value is calculated for each n-gram. The entropy weight value serves to indicate the relevance of a particular n-gram in the context of all of the n-grams appearing in the source language. For example, in the English language (which has 27 basic characters) there is a mathematical potential for $27^3$ or 19,683 trigrams. This number is considerably larger if capitalization and other common characters are included. However, because of phonological constraints the number is actually much lower. It has been found through language analysis that only a few thousand n-grams occur with sufficient frequency to be considered relevant.

One formula for entropy weighting is:

$$\text{Entropy}_i = 1 - \frac{\sum_{k=1}^{N} \frac{\text{freq}_{ik}}{\text{tfreq}_i} \log_2 \frac{\text{tfreq}_i}{\text{freq}_{ik}}}{\log_2 N} \text{ where:}$$

Entropy$_i$=entropy weight for a letter n-gram i;
freq$_{ik}$=frequency of letter n-gram i in text segment k;
tfreq$_i$=total frequency of letter n-gram i in all text segments; and
N=total number of text segments.

Each of the values in this formula are available in the files already described. Hence, in step 119 each set of n-gram:frequency pairs is selected in turn and an entropy weight is calculated. Once the entropy weights are calculated in step 119, the result is a tabulation on including each of the i n-grams in the sample text file and an entropy weight associated therewith resembling:

| n-gram 1 | n-gram 2 | n-gram 3 | ... | n-gram i-1 | n-gram i |
|----------|----------|----------|-----|------------|----------|
| 1        | .44      | .29      |     | .67        | .21      |

Not all of the n-grams have sufficient relevance to be useful to the translation memory. Using the entropy formula given above, all of the entropy weights will range between 0.0 and 1.0. A threshold filter is applied in step 121 to eliminate irrelevant or less useful n-grams from the global n-gram:weight file. A threshold range is set having an upper and a lower bound (usually between 0.30 and 0.99, although these values can be changed to meet the demands of a particular application) and any n-gram whose value is not between the threshold range is dropped from the list. The lower weighted n-grams tend to be affixes, suffixes, and common words such as "an", or "the". Entropy weights near 1.0 are associated with n-grams that occurred very rarely in the sample text file and so are not characteristic of the source language and likely less useful for translation purposes.

The filtered n-gram:weight file is stored for future reference in step 123. The filtered n-gram:weight file represents a kind of dictionary listing relevant n-grams for a particular language, along with a weight that defines how relevant each n-gram is. Depending on the nature of the sample text, this file could be used any number of times. As will be seen, the language analyzer is used on many different types of files throughout the processes in accordance with the present invention.

3. Entropy Weight Normalization

An extension of the language analysis program useful in translation memories is a text segment vector file that comprises a set of unique n-grams for each text segment in a source language file paired with relevance weights for that n-gram. Such a file has a general format:

TABLE 3

| Text Segment No 1 | |
|---|---|
| n-gram | weight |
| n-gram | weight |
| n-gram | weight |
| n-gram | weight |
| Text Segment No 2 | |
| n-gram | weight |
| n-gram | weight |
| n-gram | weight |
| n-gram | weight |
| Text Segment No N | |
| n-gram | weight |
| n-gram | weight |
| n-gram | weight |
| n-gram | weight |

For a source text file having N text segments. It should be understood that the simplified representation in Table 3 does not represent an actual file structure, but instead illustrates the contents of a desired text segment vector file. Each text segment vector comprises a number of n-grams which can be thought of as dimensions of the text segment vector. Each dimension has a magnitude defined by the associated weight value. Each text segment vector can include any number of n-grams:weight pairs depending on the length and n-gram content of the text segment.

Figure 2:
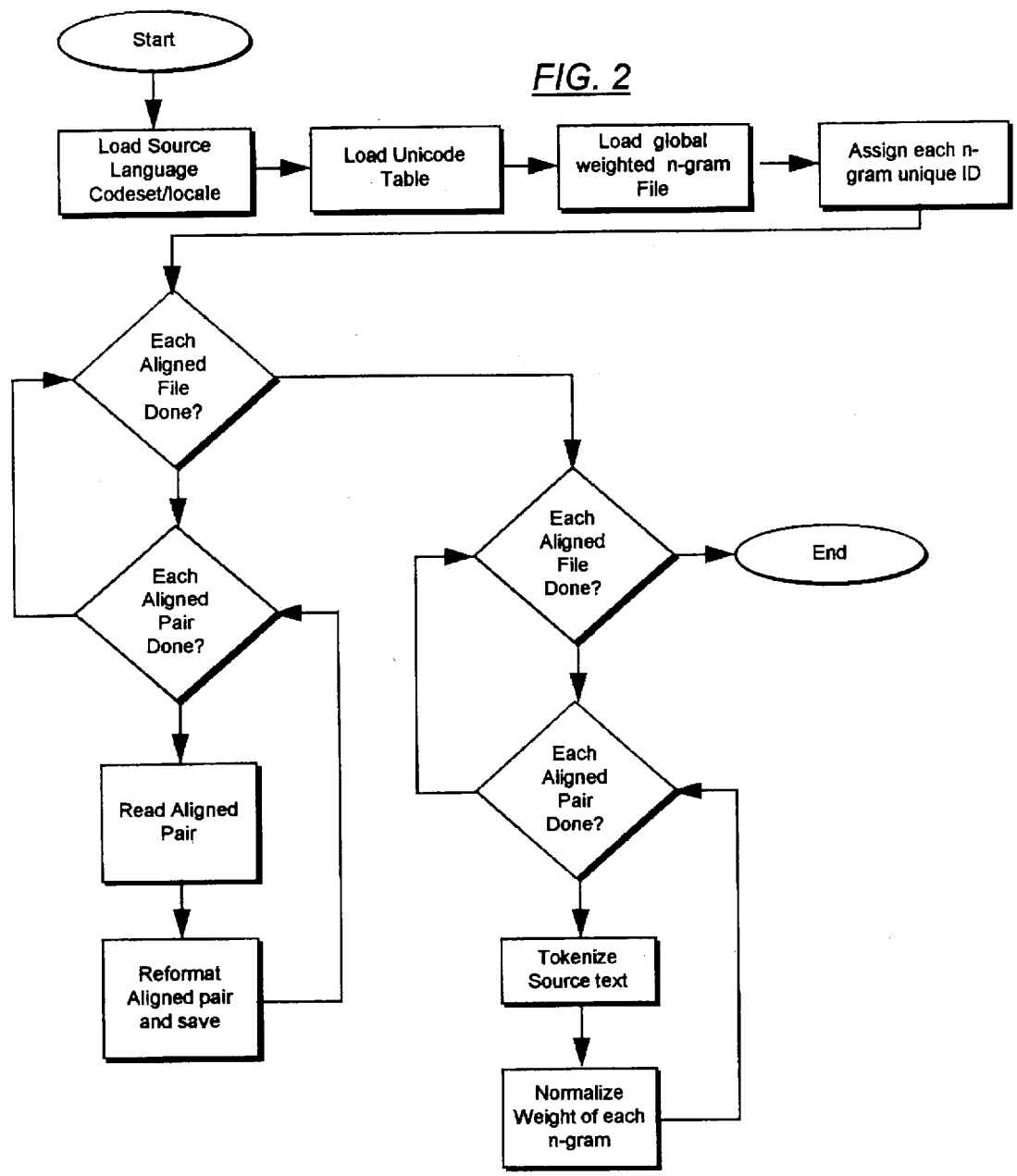
FIG. 2 shows a flowchart illustrating steps involved in a entropy normalization process in accordance with the present invention.

FIG. 2 illustrates the steps in creating the text segment vector file from a source language text. The source language text is preferably taken from an aligned file having a plurality of source language text segments paired with target language text segments. However, only the source language text segments are processed through the steps illustrated in FIG. 2.

The process of FIG. 2 is initialized by loading the source language codeset, such as ASCII for English texts, and locale information in step 201. The locale information identifies the text as American English vs. British English, for example. In step 203 the Unicode table is loaded holding information regarding the standard Unicode codeset. The global filtered n-gram:weight file generated by the language analyzer is loaded in step 205 and each unique n-gram in the global filtered n-gram:weight file is assigned a unique ID number in step 207. The assignment of a ID number is intended to ease processing by allowing easier reference to the several thousand n-grams listed in the global filtered n-gram:weight file.

Moving now to steps 213 and 214, each aligned pair is selected in turn from the aligned file and read in step 213. The selected aligned pair is reformatted by calculating the size in bytes of each text segment and then saving the reformatted aligned pair with the associated byte lengths in step 214. Steps 213 and 214 ease the process of reading, searching, and retrieving the aligned pairs through subsequent processing steps. It should be understood that steps 213 and 214 are optional, but greatly enhance the speed of operation of the method and translation memory in accordance with the present invention.

Step 211 serves to sequentially process each aligned pair from an aligned file through steps 213 and 214. Similarly, step 209 serves to sequentially process each aligned file when more than one aligned file is to be processed. Steps 209 and 211 increase utility of the preferred embodiment, but can be modified or eliminated to meet the needs of a particular application.

It is intended that the text segment vectors provide a basis for searching the source text file in response to a query. This process is described in greater detail below in the subsection entitled "Retrieval". At this stage it is important to understand that the number of n-grams listed in each text segment vector and the weights must be chosen to allow effective matching (identical and fuzzy).

To this end, the listed n-grams are filtered as set out in the language analyzer discussion to remove noisy n-grams. This can be done by removing any n-grams that do not appear in the global filtered n-gram:weight file created by the language analyzer module. Because the noisy n-grams do not aide—and may even hinder—matching with a query, they are eliminated. Where the source language text segments have already been processed by the language analyzer, it will be recalled that a file of n-gram:frequency pairs was stored in step 115. This file can serve to provide the tokenized source text required allowing flow to pass to step 222 for normalization. Alternatively, each aligned pair from each aligned file are selected in turn as caused by steps 217 and 219. The source text of the selected aligned pair is tokenized in step 221 as set out hereinbefore.

The text segments making up the source language text file will typically vary significantly in length from words to phrases to full sentences or paragraphs. It is more likely that longer text segments will include letter n-grams in common with a query simply because the probability of an n-gram match increases when there are more n-grams in the text segment. Weight normalization is advantageous to avoid the bias of the longer text segments. One way to do this is to supply a weight, normalized for segment length, for each n-gram:segment pair, producing a segment:n-gram:weight tuple. This method simplifies the similarity calculations used below in the retriever module as well since the dot product of the vectors now (with the normalized weights) produces the same results as the more computationally expensive cosine measure.

An example formula for normalizing the weights in the text segment vectors is:

$$\text{NormalizedEntropy}_{ik} = \frac{(\text{freq}_{ik})(\text{Entropy}_i)}{\sqrt{\sum_{i=0}^{n} (\text{freq}_{ik})^2 (\text{Entropy}_i)^2}}$$

where:

Entropy$_i$=entropy weight for a letter n-gram i from the global entropy calculation;

freq$_{ik}$=frequency of letter n-gram i in text segment k; and n=total number of unique letter n-grams.

The normalized entropy calculation is performed in step 222 for each n-gram separately for each text segment in the source language file. This results in changing the weights such that any particular n-gram may have one weight in a first text segment, with an different weight value for other text segments.

The text segment vectors that result comprise for each text segment in the source text file a listing of relevant n-grams where each n-gram is associated with a normalized entropy weight value. For the text segment discussed earlier in Table 1, this may look like:

| be_ | e_b | _bo | boy | oy_ | _ra | ran |
|---|---|---|---|---|---|---|
| .35 | .47 | .55 | .7 | .31 | .32 | .57 |

Note by comparison of Table 1 with Table 4 that several entries in Table 1 do not appear in Table 4 due to filtering of noisy n-grams. Also note that the weights in Table 4 are normalized in the manner discussed above. Table 4 represents the data included in each text segment vector and may be organized in database files in any convenient manner. A preferred file organization that provides good searching capability is presented hereinafter.

4. Indexing

Indexing is important for rapid retrieval of information from a translation memory. As the TM is intended to be a tool aiding human translators, the TM must respond in real time to queries from the translator. Real time response is obtained by creating a table of relevant (i.e., not noisy) n-grams with a list of the text segments that contain them. This table is called an inverted index and allows us to quickly find the segments we are interested in, while ignoring the rest. Inverted indices require extra memory and disk storage to store the inverted index, which may be as large as or larger than the aligned file. The preferred indexing algorithm used by the TM system in accordance with the present invention is a variant of a system known as a FAST-INV algorithm by Edward A. Fox and Whay C. Lee of Virginia Tech. The idea of FAST-INV is to break the text segment:n-gram:weight tuples into loads that can be processed in main memory, avoiding the slow disk-bound sorting that would otherwise be needed. This enables the present invention to index gigabytes of text on a standard personal computer with 8 Mb of main memory. While the index described in the preferred embodiment is believed to offer superior performance, it should be understood that a number of other well-known text retrieval schemes may be used with somewhat degraded performance. Examples include search tree structures, hashing functions, and digital trees. Also, other retrieval methods are known including sequential scanning of text stored in memory and a variety of inverted indexing structures including sorted arrays, B-trees, tries and the like. The particular indexing scheme illustrated in the preferred embodiment is not intended to be a limitation of the present invention.

Figure 3:
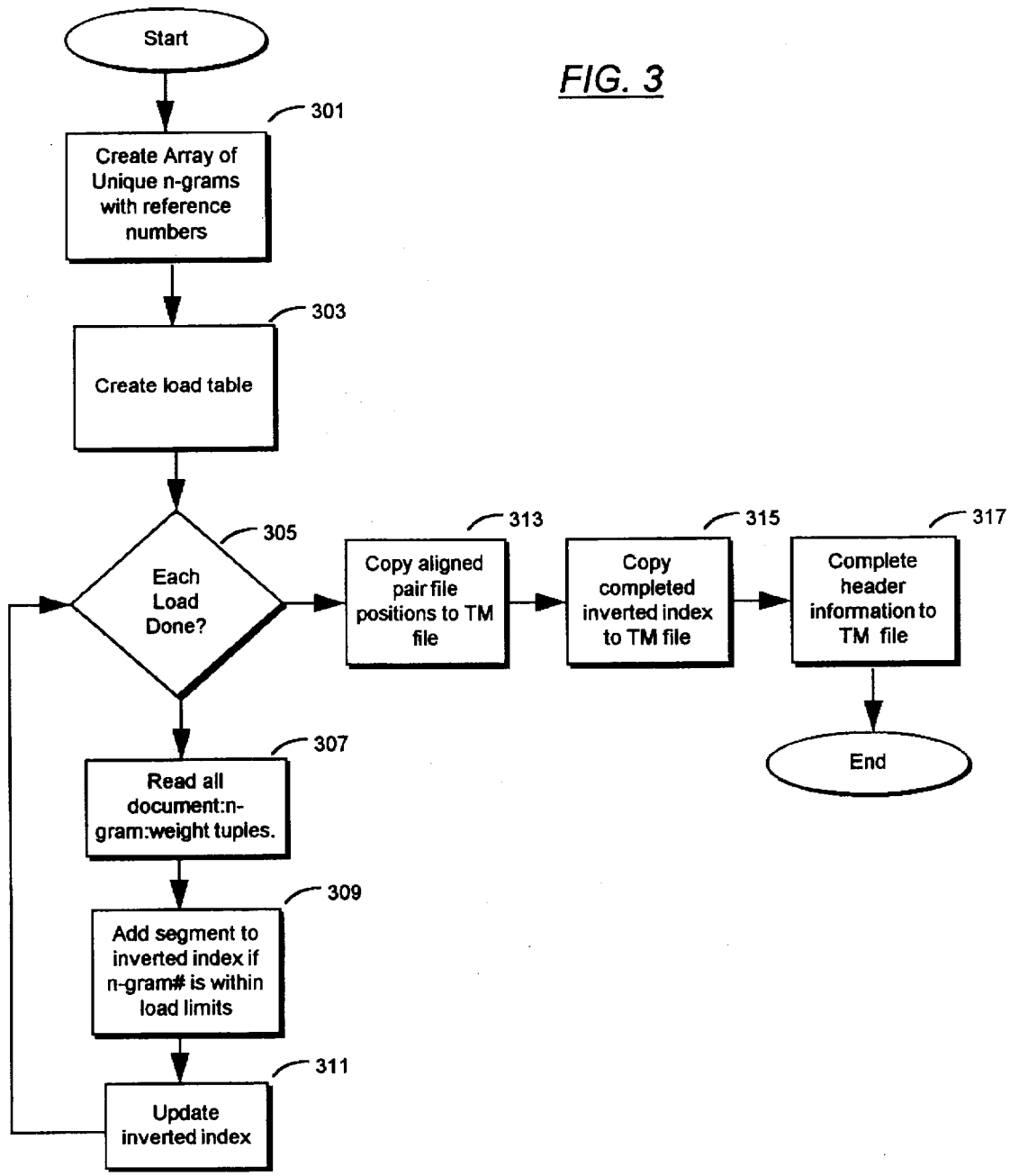
FIG. 3 shows a flowchart illustrating steps involved in a inverted indexing method in accordance with the present invention.

The preferred embodiment inverted index is created as illustrated in FIG. 3. In step 301, a list of the unique n-grams and weights are loaded in step 301 from the global filtered n-gram:weight file created by the language analyzer module. Reference numbers are assigned to each n-gram in a manner similar to step 207 described hereinbefore. In step 303 a "load table" is created by examining all the segment:n-gram:weight tuples and calculating the number of loads that will allow each lode to fit into available memory. The load table contains ranges of n-gram ID numbers starting at zero and ending with the largest ID number. For example, the first load may allow only the n-grams numbered 0–214, the second load allowing n-grams 215–302, etc. The ranges of the loads are estimated by counting the number of n-gram:weight pairs that can safely reside in available memory when only processing the n-grams within that range. The creation of a load table is a distinguishing feature of the FAST-INV algorithm and allows personal computers with limited memory to index gigabyte-size files.

Once the load table is created in step 303 each load it processed in turn through steps 307–311. An inverted index is created in memory. All text segment:n-gram:weight tuples are sequentially read in from the text segment vectors created in the normalization process described in reference to FIG. 2. If a text segment includes an n-gram in the current load table, the segment identification is added to the corresponding entry in the inverted index in step 309. The inverted index is then stored to permanent memory such as a magnetic disk in step 311.

The stored inverted index file includes, for each n-gram, a pointer to a unique posting vector in a posting vector file. The posting vector file contains a posting vector for each n-gram in the index. Each posting vector comprises a list of document identifications where each document identification is associated with the normalized weight for the selected n-gram in the selected document. Each posting vector is located at a unique address in the translation memory, and the inverted index makes reference to these unique addresses. This is accomplished in step 309 by adding the unique address corresponding to the posting vector to the index file. The concept of posting vectors in an inverted index structure is well known and additional understanding may be gained by reference to information retrieval texts.

Once all loads are processed, step 305 passes control to step 313 where the translation memory is assembled. In step 313, the aligned pair file created in step 215 is copied into the translation memory so that each aligned pair is positioned at a unique address in the TM. In step 315, the posting vectors and the completed inverted index are copied to the TM. The TM is completed by supplying header information in step 317 including useful details such as an indication of the size of n-gram used, beginning address of the inverted index, count of the number of aligned pairs in the TM, and various details of the structure and location of the aligned pair data. Other information may be copied to the header to meet the demands of a particular application.

Figure 4:
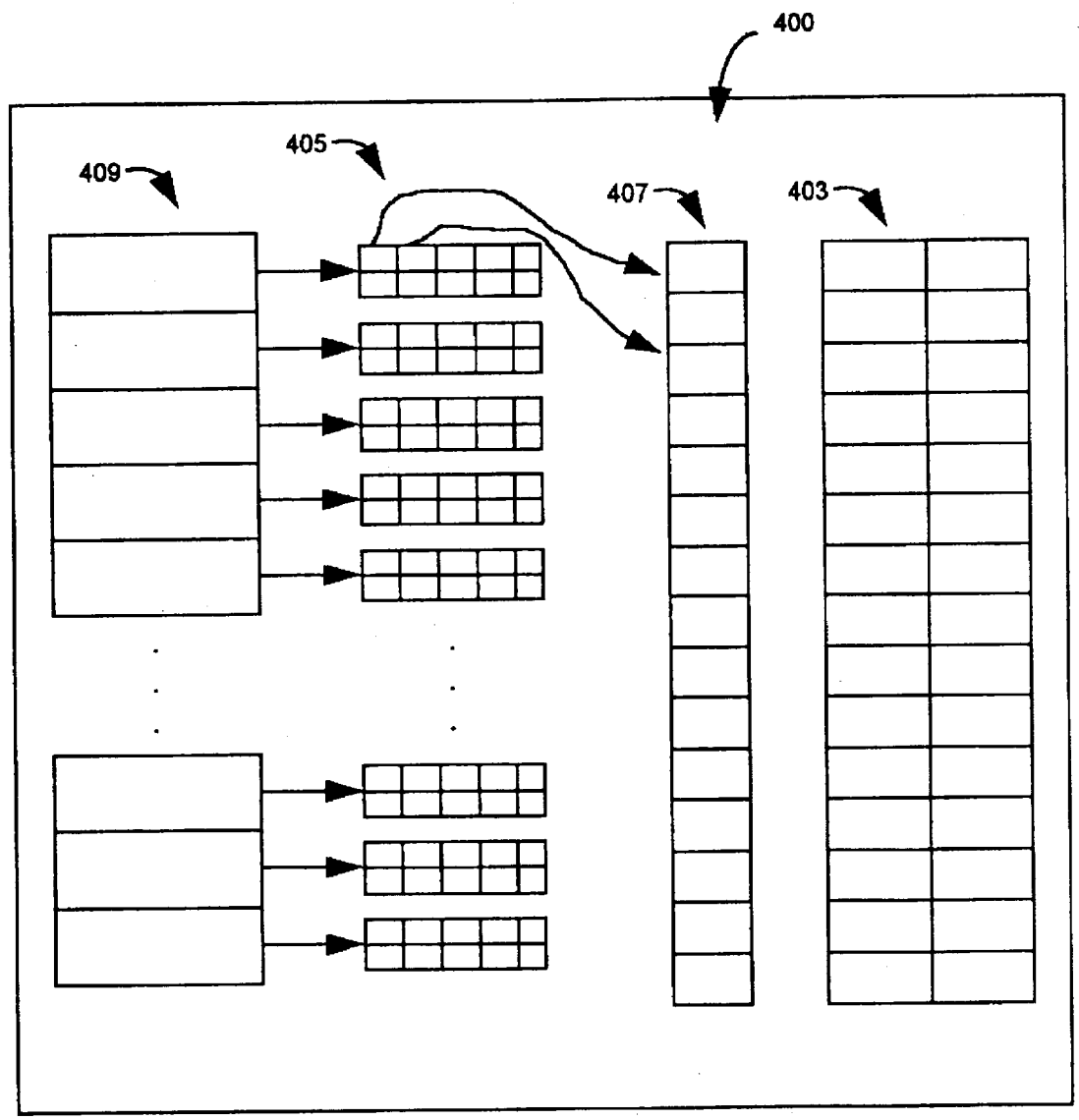
FIG. 4 illustrates in block diagram form a sample translation memory in accordance with the present invention.

A sample TM 400 in accordance with the present invention is show in FIG. 4 in block diagram form to aide understanding. In addition to the components shown in FIG. 4, header information (not shown) is added to TM 400 stores general information describing details of the TM structure and location of the other components as set out hereinbefore. Aligned pairs file 403, illustrated in detail in FIG. 5, includes each of the aligned pairs together with an indication of the size of each source language text segment and target language text segment in the aligned pairs file. The segment size information allows more rapid sequential access to the contents of the aligned files pair.

Figures 5, 6:
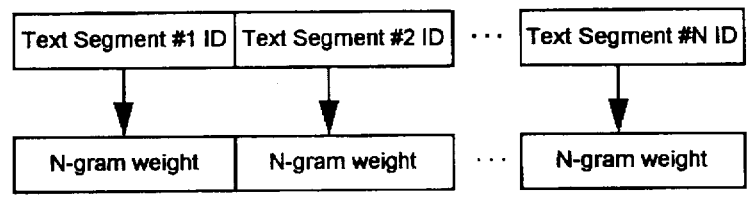
FIG. 5 illustrates in block diagram form a translation memory file in accordance with the present invention.
FIG. 6 shows a file format for an aligned pair file in accordance with a preferred embodiment.

The posting vectors file 405 includes the posting vectors for each n-gram in the index file 409. Each posting vector in posting vector file 405 is located at a unique address in the posting vector file 405 associated with one n-gram in index 409 as suggested by the arrow in FIG. 4. An example structure of the postings vector file 405 is shown in FIG. 6. In order to simplify and expedite indexing and retrieval using the FAST-INV type algorithm, postings vector file 405 lists text segment ID numbers rather than directly referring to the unique address of each text segment in aligned file 403. This can be eliminated if another indexing and retrieval algorithm is used.

Correlation file 407, illustrated in detail in FIG. 7, is used to store information correlating each text segment ID number in postings vector file 405 with the unique address in the aligned pair file 403. Each posting vector in file 405 can thus be linked back to a number of text segments in aligned pair file 403 using the correlation file 407.

Inverted index file 409, illustrated in greater detail in FIG. 8, can be thought of as a table listing a number of unique n-grams for the source language. The actual n-grams that are listed are determined from the language analyzer module described hereinbefore. Associated with each n-gram is its entropy weight that was determined in step 119. The list of n-grams and weights is taken from the global filtered n-gram:weight file stored in step 123 shown in FIG. 1. In addition to the entropy weight, each n-gram entry is also associated with a count of the number of text segments that include the n-gram entry. This count describes the size of the corresponding posting vector in file 405. Further, the index file contains a listing of pointers to the unique address of the posting vector associated with each n-gram. In a specific example the index file is stored as a hash table. Hence, by searching through the inverted index for a particular n-gram, all text segments in the aligned pair file that include that particular n-gram can be identified.

5. Retriever

The retriever uses the translation memory to quickly find all text segments in aligned pair file 401 similar to the text of a query segment. Text segments with n-grams in common with the query segment are assigned a score based on the normalized weights stored with the segments. The segments with matching n-grams are returned to the user and sorted according to the assigned similarity scores. The user is then presented the closest matching segments first. A score is presented with each presented segment where 100 is a perfect match and 0.0 is no match. In a preferred embodiment, text segments generating a fuzzy match score less than 80% are not presented to the user, although this threshold value can be modified to meet the needs of a particular application.

Figure 9:
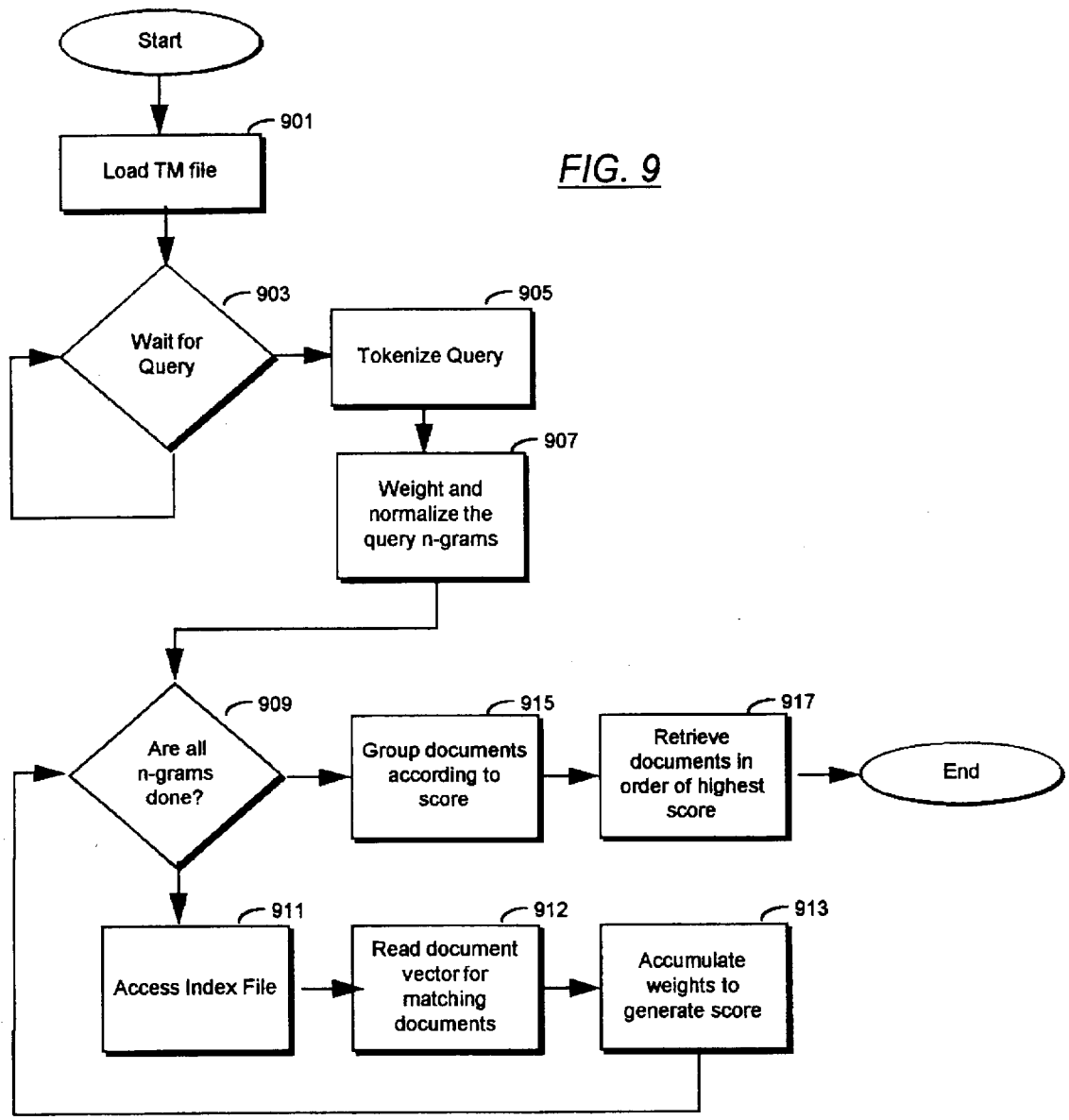
FIG. 9 illustrates a flowchart showing steps involved in a retrieval method in accordance with the present invention.

The steps involved the retriever process are shown in FIG. 9. Retrieval in accordance with the present invention assumes that a suitable TM file has been created using the processes described hereinbefore or their equivalent. A TM file is loaded in step 901 and a user enters a query segment in step 903. The query is tokenized, weighted, filtered, and normalized in steps 905 and 907 in a manner similar to that described earlier in the language analyzer and entropy normalization modules. After step 907, the query is represented by a query vector having a listing of normalized weights for each unique n-gram in the query that has not been eliminated by the filtering process.

In step 909, each n-gram of the query vector is selected in turn and processed through steps 911, 912 and 913. Each n-gram is selected in turn, and used to access index file 409. Index file 409 returns (either by itself or in conjunction with correlation file 407) a number of pointers to specific locations in the posting vector file 405. In step 912, each of the text vectors that are pointed to in step 911 are read into memory and tested for similarity to the query vector. A number of algorithms are known for calculating a logical distance or similarity of two multi-dimensional vectors. One example is a vector cosine function.

In the preferred embodiment, the use of normalized vectors simplifies the determination of similarity between the query vector and the text segment vectors of the TM. In step 913, an array is created having an entry for each text segment in the aligned pair file 403. Associated with each array entry is a score that is initially set to zero. As each n-gram is selected in turn, the normalized entropy weight of the selected n-gram in the query vector is multiplied by the normalized entropy weight for the selected n-gram in each text segment in the aligned pair. It will be recalled that the normalized entropy weight for the selected n-gram in each text segment in the aligned pair is available from the posting vector. The result of this multiplication is added to the score associated with the text segment entry. As each n-gram in the query vector is processed, the array accumulates a score, which will be between 0.0 and 1.0 in the method of the preferred embodiment, representing the similarity between the query vector and each of the text segment vectors.

When all n-grams of the query vector have been processed, flow proceeds to step 915 where the array is sorted in order of decreasing scores. In a preferred embodiment, the array is also grouped so that the text segments having the highest score are grouped together, making retrieval faster. Sorting and grouping the array are optional features that greatly increase utility of the present invention. In step 917 the text segments are retrieved from the sorted array so that the most similar documents are retrieved first.

Should an exact match exist between a query vector and a text segment vector, the score accumulated in step 913 will be close to 100. Because neither the text segment (posting) vectors nor the query vector include any information about grammar or syntax or word structure that is language specific, the retriever will easily detect matches even where there are misspellings, variations, changes in word order, or the like between the aligned pair text and the query text.

Another advantage of the TM in accordance with the present invention is that by using n-grams rather than words as a basis for analyzing text, the TM has proven to be truly language independent. This means that all of the steps set out herein can be processed virtually identically without regard to the language or locale of the source text. So long as the encoding format is known so that the source text can be recoded using Unicode, the present invention will offer similar performance in all languages.

A further unexpected advantage of the method of the present invention is that it provides such rapid fuzzy retrieval that the TM functions admirably as an electronic concordance. A user can enter a word or phrase as a query and the retriever will return all text segments from the aligned pair file that include that word or phrase. The translator can review these returned text segments to view the word or phrase in a variety of contexts.

A number of specific examples and details regarding file formats have been set out herein that are not limitations to the practice of the method of the present invention. Those of skill in the text retrieval art will readily detect modifications to the basic teaching of the present invention that will adapt the basic teaching to particular applications. It is to be expressly understood that the claimed invention is not to be limited to the description of the preferred embodiments but encompasses other modifications and alterations within the scope and spirit of the inventive concept

We claim:

1. A translation memory comprising:
   a computer usable medium having computer readable data embodied therein, the computer readable data further comprising:
   an aligned file having a number of source language text segments encoded in a computer readable format, each of the source language text segments positioned at a unique address in the computer usable medium and paired with a target language text segment encoded in computer readable format;
   an inverted index comprising a listing of source language letter n-grams, wherein each listed n-gram includes an associated entry for an entropy weight for the listed letter n-gram, a count of the number of source language text segments in the aligned file that include an entry for the listed letter n-gram, and a pointer to a unique location in the computer usable memory; and
   a posting vector file having a posting vector associated with each listed n-gram in the inverted index, each posting vector positioned at one of the unique locations pointed to in the inverted index, each posting vector including:
   i) a plurality of document identification numbers each corresponding to a selected one of the source language text strings in the aligned file, and
   ii) a number of entropy weight values, each of the number of weight values associated with one document identification number.

2. The translation memory of claim 1 wherein the computer readable data further comprises: correlation file comprising a listing of each of the unique addresses for the source language text strings, wherein each of the unique addresses in the correlation file is identified with one document identification number.

3. The translation memory of claim 1 wherein the letter n-grams have a length in the range of two to three source language characters.

4. The translation memory of claim 1 wherein the entropy weight is calculated from:

$$\text{Entropy}_i = \frac{1 - \sum_{k=1}^{N} \frac{\text{freq}_{i,k}}{\text{tfreq}_i} \log_2 \frac{\text{tfreq}_i}{\text{freq}_{i,k}}}{\log_2 N}$$

where:

Entropy$_i$=entropy weight for a letter n-gram i;
freq$_{i,k}$=frequency of term i in text segment k;
tfreq$_i$=total frequency of term i in all text segments; and
N=total number of text segments.

5. The translation memory of claim 1 wherein the computer readable data is compressed on the computer usable medium.

6. The translation memory of claim 1 wherein the postings vector file is compressed using sparse vector coding.

7. The translation memory of claim 1 wherein the entropy weights in each posting vector are normalized.

8. The translation memory of claim 1 wherein the listing of letter n-grams is provided in Unicode format.

9. The translation memory of claim 1 wherein each of the listings of letter n-grams include only letter n-grams having an entropy value within a predetermined range.

10. A method for creating a translation memory used to translate from a source language to a target language, the method comprising the steps of:

providing a weighted letter n-gram file for the source language;

providing an aligned file comprising a plurality of source language text strings, each source language text string paired with a target language document; and creating an inverted index from the aligned file, the inverted index comprising a listing of unique letter n-grams appearing in the aligned file wherein each listing of a unique letter n-gram in the inverted index is associated with a set document identifications that point to source language text strings in the aligned file that contain the associated letter n-gram.

11. The method of claim 10 wherein the step of providing a weighted letter n-gram file for the source language comprises the steps of:

providing a quantity of source language text;

tokenizing the quantity of source language text to identify a set of unique letter n-grams in the source language;

calculating an entropy weight for each of the identified unique letter n-grams in the source language;

filtering the set of unique letter n-grams to remove letter n-grams having an entropy weight below a preselected threshold weight;

filtering the set of unique letter n-grams to remove letter n-grams having a frequency of occurrence below a preselected threshold frequency; and saving the filtered set of unique letter n-grams with the associated entropy weight for each letter n-gram to the weighted letter n-gram file for the source language.

12. The method of claim 11 further comprising the step of converting each unique letter n-gram in the tokenized source language text to Unicode before the step of calculating.

13. The method of claim 10 wherein the step of creating an inverted index comprises:

selecting each source language document from the aligned file in turn;

tokenizing the selected source language document to determine each letter n-gram contained therein;

filtering the tokenized document to remove letter n-grams not appearing in the weighted n-gram file for the source language; and pairing each letter n-gram remaining in the selected document after the filtering with its associated entropy weight from the weighted letter n-gram file for the source language.

14. The method of claim 11 further comprising the step of converting each n-gram in the tokenized document to Unicode before filtering.

15. The method of claim 11 wherein the step of creating an inverted index from the document vectors comprises applying a FAST-INV algorithm to the document vectors for each source language document.

16. A method for analyzing language comprising the steps of:

providing a plurality of text strings to be analyzed;

identifying the text codeset applying to the plurality of text strings;

selecting each of the text strings in turn;

tokenizing the selected text segment to determine a set of letter n-grams appearing in the selected text document;

converting each of the set of letter n-grams to Unicode values;

defining a set of unique letter n-grams by adding each letter n-gram determined in the tokenizing step to the set of unique letter n-grams so long as each of the letter n-grams appear in the set of unique letter n-grams only once;

computing a frequency of occurrence of each letter n-gram in the set of unique letter n-grams among the plurality of text strings;

calculating an entropy weighting for each letter n-gram in the set of unique letter n-grams;

filtering the set of unique letter n-grams to remove letter n-grams having an entropy weight below a preselected threshold;

pairing each letter n-gram remaining in the set of unique letter n-grams with the calculated entropy weight; and saving the letter n-gram: entropy weight pairs to a weighted n-gram file.

17. A method for creating an inverted index to a file containing a plurality of text strings comprising the steps of:

creating a list of letter n-grams wherein each listed letter n-gram has an entropy weight greater than a preselected threshold;

for each listed letter n-gram, determining a set of the plurality of text strings in which the letter n-gram appears.

18. A method for retrieving a target subset of text strings from a plurality of text strings comprising the steps of:

inputting a text query;

tokenizing the text query to determine a set of letter n-grams appearing in the text query;

filtering the tokenized text query to remove letter n-grams having an entropy weight below a preselected threshold;

pairing each remaining letter n-gram in the tokenized text query with an entropy weight; and using an inverted index to the plurality of text strings, determining the target subset of the plurality of text strings in which any of the paired letter n-grams appear.

* * * * *